United States Patent [19]
MacKenna et al.

[11] Patent Number: 4,878,181
[45] Date of Patent: Oct. 31, 1989

[54] VIDEO DISPLAY CONTROLLER FOR EXPANDING MONOCHROME DATA TO PROGRAMMABLE FOREGROUND AND BACKGROUND COLOR IMAGE DATA

[75] Inventors: Craig A. MacKenna, Los Gatos; Jan-Kwei J. Li, San Jose, both of Calif.

[73] Assignee: Signetics Corporation, Calif.

[21] Appl. No.: 121,504

[22] Filed: Nov. 13, 1987

Related U.S. Application Data

[63] Continuation-in-part of Ser. No. 931,760, Nov. 17, 1986, abandoned.

[51] Int. Cl.[4] .............................................. G06F 3/153
[52] U.S. Cl. .................................... 364/518; 364/521; 340/731
[58] Field of Search ................ 340/731, 725; 364/518, 364/522, 521; 358/81, 80, 76, 75

[56] References Cited

U.S. PATENT DOCUMENTS

| | | | |
|---|---|---|---|
| 3,376,465 | 4/1968 | Corpew | 358/81 |
| 3,659,283 | 4/1972 | Ophir | 340/731 |
| 3,761,607 | 9/1973 | Hanseman | 358/81 |
| 4,149,152 | 4/1979 | Russo | 340/703 |
| 4,283,724 | 8/1981 | Edwards | 340/731 |
| 4,357,604 | 11/1982 | Imazeki et al. | 340/731 |
| 4,408,200 | 10/1983 | Bradley | 340/703 |
| 4,498,079 | 2/1985 | Ghosh et al. | 340/725 |
| 4,648,028 | 3/1987 | Deklotz et al. | 364/188 |
| 4,695,967 | 9/1987 | Kodair et al. | 364/521 |
| 4,727,430 | 2/1988 | Miwa | 358/283 |
| 4,733,230 | 3/1988 | Kurihara | 340/728 |
| 4,739,397 | 4/1988 | Hayashi | 358/80 |
| 4,752,893 | 6/1988 | Guttag et al. | 364/518 |
| 4,754,488 | 6/1988 | Lyke | 382/22 |
| 4,763,283 | 8/1988 | Coutrot | 364/526 |

FOREIGN PATENT DOCUMENTS

| | | | |
|---|---|---|---|
| 2515908 | 5/1983 | France | 358/81 |

*Primary Examiner*—Gary V. Harkcom
*Assistant Examiner*—Phu K. Nguyen
*Attorney, Agent, or Firm*—Thomas A. Briody; Jack E. Haken; Jack D. Slobod

[57] ABSTRACT

A circuit which expands monochrome character image patterns to color form for use in a raster scanned computer display system. Monochrome patterns are expanded from one bit per pixel to n bits per pixel. Foreground and background colors are programmable in a pattern generator which uses data from the expanded source patterns to select appropriate colors and characters for a destination pattern to be displayed. The expanded multicolor image is generated by hardware.

10 Claims, 3 Drawing Sheets

VIDEO DISPLAY CONTROLLER FOR EXPANDING MONOCHROME DATA TO PROGRAMMABLE FOREGROUND AND BACKGROUND COLOR IMAGE DATA

CROSS-REFERENCE TO RELATED APPLICATIONS

This is a continuation-in-part of patent application Ser. No. 931,760, filed Nov. 17, 1986, now abandoned.

BACKGROUND OF THE INVENTION

1. Field of the Invention

This invention pertains to the general field of video display controllers or raster scan display controllers which are used in computer systems. In particular it pertains to a logic circuit which is used to expand a monochrome image to a color image while minimizing memory storage requirements for a multicolor display.

2. Description of the Prior Art

Most presently available video display systems typically include a processor, a video controller, a display memory containing a single current screen image, other system memory, and a raster scan video display. In normal (steady-state) operation, the video controller continually reads out the contents of the display memory and transforms the information read into signals which control the raster scan beam during its active display time. The video controller also provides the horizontal and vertical retrace signals at appropriate intervals, and blanking of the raster scan beam during retrace.

The processor also has access to the display memory, so that it can change the current screen image. This access may either be "through" the video controller or "around" it. The subject invention applies to the former type of system. In either case, use of the display memory typically involves careful control of updating and display accesses to prevent image breakup while the video image is being changed.

SUMMARY OF THE INVENTION

An improved video controller incorporating the present invention is a logic circuit which includes an address module and preferably at least one data module. The controller is designed to work with an external processor which generates the instructions for controller operation. The major function of the address module is to control and initiate access to the display memory for both video refreshing and updating, while the data modules are used to collect and integrate video refresh data that has been read out from the display memory. The data output from the data module passes through high speed shift registers and a look-up table to a CRT display. The major parts of the address module are a synchronous signal generator, a window controller, an update controller and an interface controller. The address module also has the ability to update the contents of the display memory according to instructions passed from the host processor. Thus, the host processor does not have to access display memory to insert characters or graphic elements into display memory. It only passes the appropriate instructions and/or data to the controller. The present application pertains to a novel feature in the update controller.

In color CRT systems, wherein there are two or more memory bits per pixel, many images/shapes/characters are shown in one particular color. Such monochrome images can actually be defined by a pattern of one bit per pixel (1=part of image, 0=not part of image). When the display on a CRT screen is updated by a controller, the most typical operation is to display a shape, e.g. a character, on the screen in a single color. Such shape is defined by a source monochrome pixel pattern which is stored in display memory as one bit per pixel. A 1 value of the bit corresponding to a particular destination pixel indicates that the pixel is part of the image and should be displayed with a color corresponding to a fixed code previously programmed in a foreground color latch. This invention expands such pixel bit patterns into n-bits per pixel, so as to provide a programmable image color and an optional programmable background color when the image is displayed on the screen. This minimizes memory requirements for storing patterns, and reduces the time needed to produce the image on the screen.

The update controller can be programmed to express a 0 bit in the image source pattern in either of two ways: (a) by changing the pixel corresponding to such bit to the color code previously programmed into a background color register, or (b) by leaving the corresponding pixel unchanged. In the former mode of operation, an entire region of the screen occupied by the image is changed to a new foreground and/or background color. In the latter mode, the image is drawn "over" a preexisting background. The operation is controlled by a pattern generator comprising foreground color and background color registers, each of which stores the number of bits needed to represent the color code for one pixel; a bits/pixel (BPP) register which defines the number of bits per pixel; and a register storing a single write/overlay bit which determines whether or not the background color is to be changed.

Before active operation begins, all of these registers are loaded (e.g. by a microprocessor) with the desired values. Also, the update controller includes an expander having a counter CT which is cleared to contain the value 0. A control unit in the update controller begins active operation by fetching one word of the monochrome source pattern from the display memory and strobing it into a "Source Latch" in the expander. The function of the expander is to convert this source pattern word into 1, 2, 4, or 8 destination words on its outputs. A programmed logic array in the expander performs this expansion by taking the word from the source latch, the contents of the BPP register (how much to expand), and the contents of the counter CT (which controls which source pattern word of a multiword expansion is being expanded). A 4-1 multiplexer produces an "empty" output which tells the control unit when a new word must be fetched from the source latch.

The control unit then fetches a word from the destination pattern in the display memory and strobes it into a destination latch in the pattern generator. (When both foreground and background are being changed, a smart control unit could omit this step, except for the first and last word of a scan line.) A 2-1 multiplexer then selects between the destination latch data and the background register data, under control of a write/overlay register bit. For each such bit, the corresponding output from the expander controls whether the display output is from the foreground latch register or the 2:1 mutliplexer. The resulting display is thus colored and/or expanded according to the preprogrammed parameters.

Thus, in the present invention, the expansion of a monochrome image pattern to a multicolor form and/or the horizontal expansion of such a pattern, is programmable by the user and effected by a logical circuit. Furthermore, the same expansion circuitry is used to provide selectable levels of such expansion. This feature adds flexibility to the system and widens its applicability.

DESCRIPTION OF THE PREFERRED EMBODIMENT

A bit-mapped raster scan video (CRT) controller includes an address module and a data module. Such a controller provides hardware support for windows in a bit-mapped alphanumeric and graphic raster scan video (CRT) display system used in a computer system having one or more main processors and is particularly advantageous for use with multi-tasking operating systems. It typically includes logic circuits whereby a description of the overlapping windows can be programmed. The cross-referenced applications, which are incorporated hereby by reference, disclose the address module and the data module in substantial detail.

The major parts of the address module are a synchronous signal generator, a window controller, an update controller and an interface controller. This application is directed primarily to the update controller of the address module. The major function of the address module is to control and initiate access to display memory for both video refreshing and updating, while the data modules are used to collect and integrate the display patterns that have been read out from the display memory. the data output by the data module(s) then goes through high speed shift register(s) and color look-up tables to the video display.

The address module also has the ability to update the contents of the display memory according to instructions received from the host processor. Therefore, the host processor does not have to access the display memory when it wants to insert characters or graphic elements into the display memory. Instead, it only needs to pass appropriate instructions to the address module.

After receiving the instructions passed from the host processor, the address module executes them one by one like a special purpose microprocessor. Since the whole procedure is hardware controlled, updating can be done within a very short time. Typically the insertion speed is 5 to 50 times faster than a software procedure on the host processor.

Figure 1:
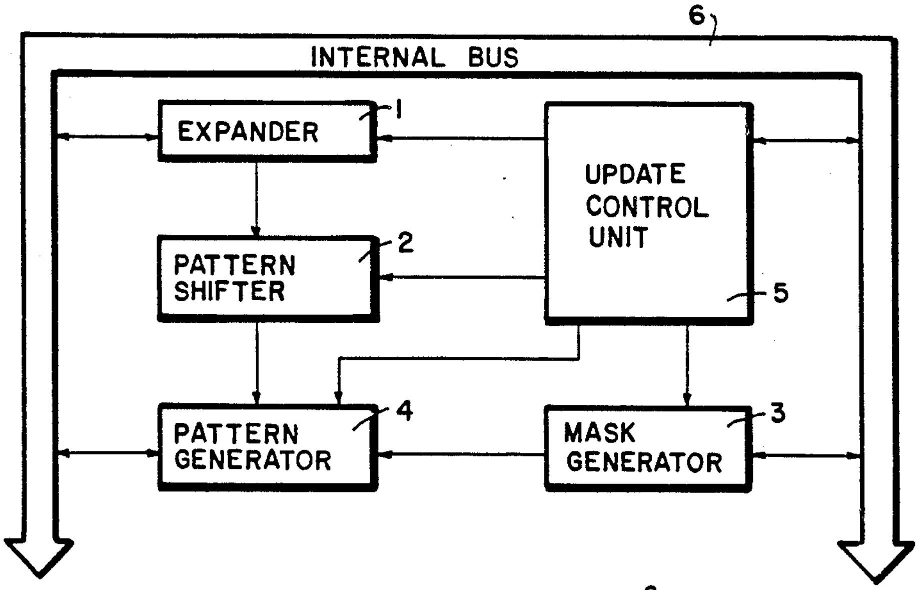
FIG. 1 is a block diagram of an Update Controller subsystem of a raster scan video controller using the invention.

FIG. 1 shows the block structure of an Update Controller. It comprises an Expander 1, Pattern Shifter 2, Mask Generator 3, Pattern Generator 4, and Update Control Unit 5. The two blocks most relevant to the invention are the Expander 1 and the Pattern Generator 4. The Update Control Unit 5 is used to update the display memory according to the instructions passed to it from the host processor. The main update function provided by the Update Control Unit 5 is to insert characters and graphics elements into the display memory. A block move can be implemented as a special case of character insertion. In this mode, operation is similar to a monochrome character insertion operation. The expander can also be used in a monochrome display mode to magnify the display patterns in the horizontal direction by a "zoom" factor of either 2, 4, or 8 times.

Figure 2:
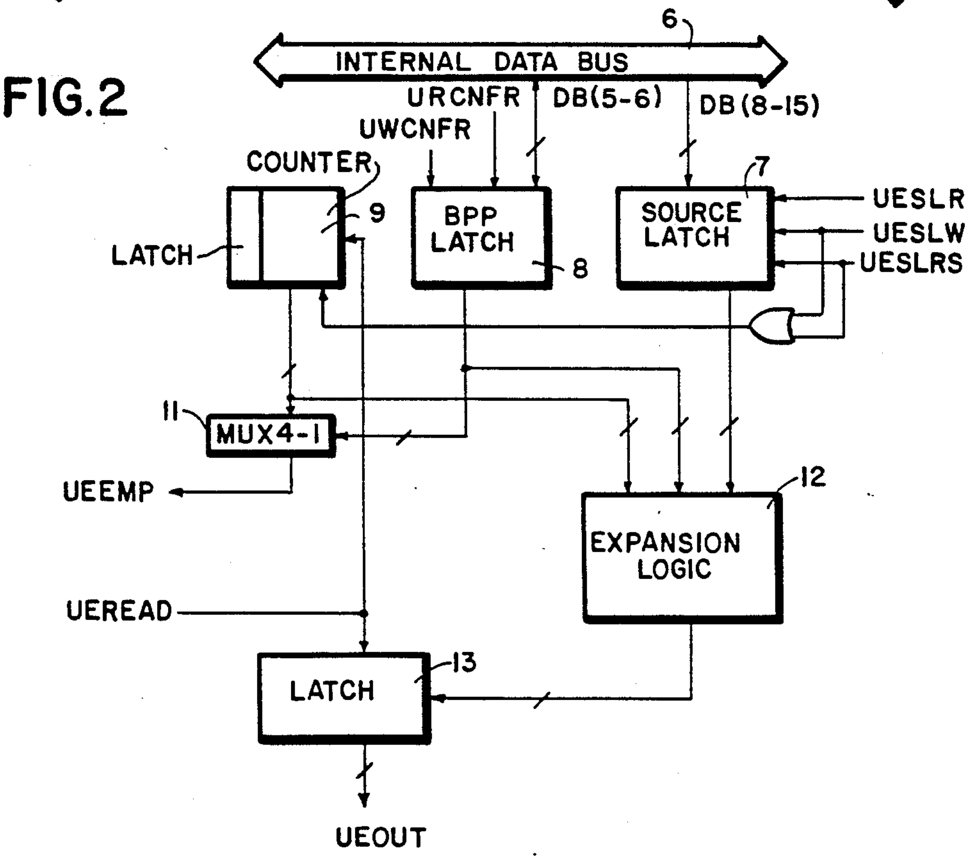
FIG. 2 details the Expander unit of the controll shown in FIG. 1.

Details of the Expander 1 are shown in FIG. 2. Under control of the Update Control Unit 5 and an Interface Controller (not shown), "source words" are read from display memory (not shown) via Internal Data Bus 6 and placed in a Source Latch 7. Each source word has 16 bits and represents a part comprising 16 pixels of an overall monochrome pattern, and can be expanded from 1 bit per pixel to a color form with 2, 4, or 8 bits per pixel, or can be left in its incoming monochrome form with 1 bit per pixel.

The choice among these four alternative functions is determined by the preprogrammed contents of a BPP latch 8. This latch has 2 bits; its contents are encoded as follows:

TABLE 1

| VALUE | FUNCTION |
|---|---|
| 00 | Leave monochrome source word unchanged with 1 bit/pixel |
| 01 | Expand monochrome source word to 2 bits/pixel |
| 10 | Expand monochrome source word to 4 bits/pixel |
| 11 | Expand monochrome source word to 8 bits/pixel |

The process of inserting a bit-mapped pattern into display memory is divided into one or more major sections which each correspond to a number of successive scan lines on the screen. Each such major section is further divided into one or more successive 16-bit "destination words".

When expansion to 2, 4, or 8 bits/pixel is to be done, one source word contains information sufficient to update 2, 4, or 8 destination words (respectively) in display memory. Therefore in these cases, the Update Control Unit 5 sequences memory accesses so that the appropriate number of destination words are accessed for each source word that is read from the monochrome pattern. A CT Counter 9 and 4-1 Multiplexer 11 function together to inform the Update Control Unit 5 when a new source word is needed by generating a signal UEEMP which is fed back to the Update Control Unit 5. The CT Counter 9 is a 4-bit binary counter which is cleared whenever the Update Control Unit 5 loads a source word into Source Latch 7. It is incremented by 1 for each destination word that is processed and written back to memory. The 4-1 Multiplexer 11 has the four outputs of CT Counter 9 as its data inputs and the two outputs of the BPP Latch 8 as its control inputs. It functions as indicated in TABLE 2.

TABLE 2

| IF THE BPP VALUE IS | THEN 4-1 MUX 11 PROPAGATES THE FOLLOWING BIT FROM CT COUNTER 9 TO LINE UEEMP | SO THAT LINE UEEMP BECOMES 1 AFTER THE FOLLOWING NUMBER OF DESTINATION WORDS ARE PROCESSED |
|---|---|---|
| 00 | Least Significant | 1 |
| 01 | 2nd-Least Significant | 2 |
| 10 | 2nd-Most Significant | 4 |

TABLE 2-continued

| IF THE BPP VALUE IS | THEN 4-1 MUX 11 PROPAGATES THE FOLLOWING BIT FROM CT COUNTER 9 TO LINE UEEMP | SO THAT LINE UEEMP BECOMES 1 AFTER THE FOLLOWING NUMBER OF DESTINATION WORDS ARE PROCESSED |
|---|---|---|
| 11 | Most Significant | 8 |

Thus, when UEEMP is 1, it is a signal to the Update Control Unit 5 that a new source word is needed.

Figure 3:
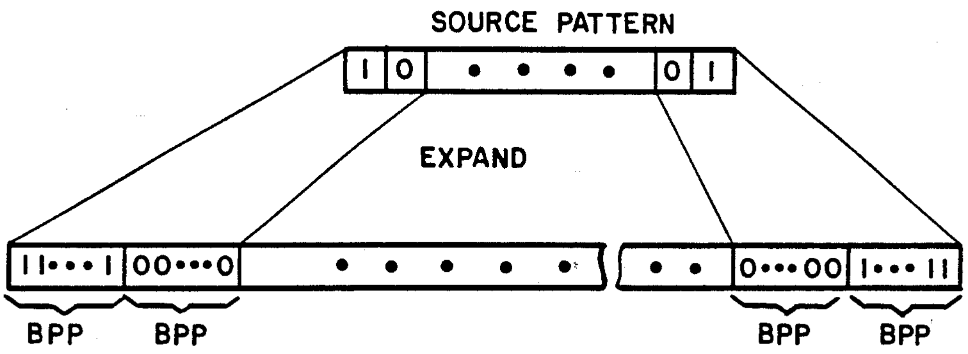
FIG. 3 exemplifies the operation of the Expander for the particular case of expansion to four bits per pixel in the source pattern.

Expansion Logic 12 takes as its inputs the 16 bit source word at the outputs of Source Latch 10, the 2 outputs of the BPP latch 8, and the three less-significant outputs of the CT counter 9. It uses these to divide the 16 bit source word into 1, 2, 4, or 8 equal segments having 16, 8, 4, or 2 bits each, respectively, depending on the BPP value. Each such segment corresponds to one destination word, and for each segment the Expansion Logic produces a 16-bit word at its outputs, having 1, 2, 4, or 8 consecutive bits (respectively) equal to the value of a single bit of the segment. The operation of the Expansion Logic 12 is exemplified in FIG. 3, for a BPP value of 10, that is, 4 bits/pixel.

The Expansion Logic can be a set of logic gates or by a Programmable Logic Array (PLA). In either case, the Expansion Logic operates according to the logic equations in TABLE 3.

TABLE 3

INPUTS:

CT0 is the least-significant bit from the CT counter 9
thru CT3 is the most-significant bit from the CT counter
I0 is the least-significant bit from the source latch 7
thru I15 is the most-significant bit from the source latch 7
BBP0 is the less-significant bit from the BPP latch 8
BBP1 is the more-significant bit from the BPP latch 8

NOTATION:

* indicates an AND operation
/ indicates a NOT (inversion, negation) operation
+ indicates an OR operation

INTERMEDIATE LOGIC TERMS

```
N0 = I0 * /BPP1 * /BPP0
N1 = I1 * /BPP1 * /BPP0
N2 = I2 * /BPP1 * /BPP0
N4 = I4 * /BPP1 * /BPP0
N5 = I5 * /BPP1 * /BPP0
N6 = I6 * /BPP1 * /BPP0
N7 = I7 * /BPP1 * /BPP0
N8 = I8 * /BPP1 * /BPP0
N9 = I9 * /BPP1 * /BPP0
N10 = I10 * /BPP1 * /BPP0
N11 = I11 * /BPP1 * /BPP0
N12 = I12 * /BPP1 * /BPP0
N13 = I13 * /BPP1 * /BPP0
N14 = I14 * /BFP1 * /BPP0
N15 = I15 * /BPP1 * /BPP0
N16 = I0 * /BPP1 * /BPP0 * CT0
N17 = I1 * /BPPI * /BPP0 * CT0
N18 = I2 * /BPP1 * /BPP0 * CT0
N19 = I3 * /BPPI * /BPP0 * CT0
N20 = I4 * /BPFI * /BPP0 * CT0
N21 = I5 * /BPP1 * /BPP0 * CT0
N22 = I6 * BPP1 * /BPP0 * CT0
N23 = I7 * /BPP1 * /BPP0 * CT0
N24 = I8 * /BPP1 * /BPP0 * CT0
N25 = I9 * /BPP1 * /BPP0 * /CT0
N26 = I10 * /BPP1 * /BPP0 * /CT0
N27 = I11 * /BPP1 * /BPP0 * /CT0
N28 = I12 * /BPP1 * /BPP0 * /CT0
N29 = I13 * /BPP1 * /BPP0 * /CT0
N30 = I14 * /BPP1 * /BPP0 * /CT0
N31 = I15 * /BPP1 * /BPP0 * /CT0
N32 = I0 *  BPP1 * /BPP0 *  CT0
N33 = I1 *  BPP1 * /BPP0 *  CT1 * CT0
N34 = I2 *  BPP1 * /BPP0 *  CT1 * CT0
N35 = I3 *  BPP1 * /BPP0 *  CT1 * CT0
N36 = I4 *  BPP1 * /BPP0 *  CT1 * /CT0
N37 = I5 *  BPP1 * /BPP0 *  CT1 * /CT0
N38 = I6 *  BPP1 * /BPP0 *  CT1 * /CT0
N39 = I7 *  BPP1 * /BPP0 *  CT1 * /CT0
N40 = I8 *  BPP1 * /BPP0 * /CT1 *  CT0
N41 = I9 *  BPP1 * /BPP0 * /CT1 *  CT0
N42 = I10 *  BPPI * /BPP0 * /CT1 *  CT0
N43 = I11 *  BPP1 * /BPP0** /CT1 *  CT0
N44 = I12 *  BPPI * /BPP0 * /CT1 * /CT0
N45 = II3 *  BPP1 * /BPP0 * /CT1 * /CT0
N46 = I14 *  BPP1 * /BPP0 * /CT1 * /CT0
N47 = I15 *  BPP1 * /BPP0 * /CT1 * /CT0
N48 = I0 *  BPP1 *  BPP0 *  CT2 *  CT1 *  CT0
N49 = I1 *  BPPI *  BPP0 *  CT2 *  CT1 *  CT0
N50 = I2 *  BPPI *  BPP0 *  CT2 *  CT1 * /CT0
N51 = I3 *  BPP1 *  BPP0 *  CT2 *  CT1 * /CT0
```

TABLE 3-continued

```
N52 = I4 *  BPP1 *  BPP0 *  CT2 * /CT1 *  CT0
N53 = I5 *  BPPI *  BPP0 *  CT2 * /CT1 *  CT0
N54 = I6 *  BPP1 *  BPP0 *  CT2 * /CT1 * /CT0
N55 = I7 *  BPP1 *  BPP0 * CT2 * /CT1 * /CT0
N56 = I8 *  BPP1 *  BPP0 * /CT2 *  CT1 *  CT0
N57 = I9 *  BPP1 *  BPP0 * /CT2 *  CT1 *  CT0
N58 = I10 *  BPPI *  BPP0 * /CT2 *  CT1 * /CT0
N59 = I11 *  BFPI *  BPP0 * /CT2 *  CT1 * /CT0
N60 = I12 *  BPP1 *  BPP0 * /CT2 * /CT1 *  CT0
N61 = I13 *  BPPl *  BPP0 * /CT2 * /CT1 *  CT0
N62 = I14 *  BPP1 *  BPP0 * /CT2 * /CT1 * /CT0
N63 = 115 *  BPP1 *  BPP0 * /CT2 * /CT1 * /CT0
OUTPUTS:
OUT0 = N0+N16+N24+N32+N36+N40+N44+N48+N50+N52+N54+N56+N58+N60+N62
OUT1 = N1+N16+N24+N32+N36+N40+N44+N48+N50+N52+N54+N56+N58+N60+N62
OUT2 = N2+N17+N25+N32+N36+N40+N44+N48+N50+N52+N54+N56+N58+N60+N62
OUT3 = N3+N17+N25+N32+N36+N40+N44+N48+N50+N52+N54+N56+N58+N60+N62
OUT4 = N4+N18+N26+N33+N37+N41+N45+N48+N50+N52+N54+N56+N58+N60+N62
OUT5 = N5+N18+N26+N33+N37+N41+N45+N48+N50+N52+N54+N56+N58+N60+N62
OUT6 = N6+N19+N27+N33+N37+N41+N45+N48+N50+N52+N54+N56+N5B+N60+N62
OUT7 = N7+N19+N27+N33+N37+N41+N45+N48+N50+N52+N54+N56+N58+N60+N62
OUT8 = N8+N20+N28+N34+N38+N42+N46+N49+N51+N53+N55+N57+N59+N62+N63
OUT9 = N9+N20+N28+N34+N38+N42+N46+N49+N51+N53+N55+N57+N59+N62+N63
OUT10 = N10+N21+N29+N34+N38+N42+N46+N49+N51+N53+N55+N57+N59+N62+N63
OUT11 = N11+N21+N29+N34+N38+N42+N46+N49+N51+N53+N55+N57+N59+N62+N63
OUT12 = N12+N22+N30+N35+N39+N43+N47+N49+N51+N53+N55+N57+N59+N62+N63
OUT13 = N13+N22+N30+N35+N39+N43+N47+N49+N51+N53+N55+N57+N59+N62+N63
OUT14 = N14+N23+N31+N35+N39+N43+N47+N49+N51+N53+N55+N57+N59+N62+N63
OUT15 = N15+N23+N31+N35+N39+N43+N47+N49+N5l+N53+N55+N57+N59+N62+N63
```

The outputs of the Expansion Logic are stored in a 16-bit Latch 13, and are captured therein at the same time the CT Counter 9 is signalled to increment, that is, once for each destination word processed and written into memory. The outputs of Latch 13 constitute the output of the Expander 1 to the Pattern Shifter 2.

The Pattern Shifter 2 aligns the output of the Expander 1 to correspond to "destination" data read from display memory. This function is not necessary to implement the present invention. For clarity of explanation, the Pattern Shifter is herein assumed to propagate the output from the Expander 1 to the Pattern Generator 4, without change.

Since the pattern to be inserted into display memory can start and end at any pixel on the screen, and can be any number of pixels in width, it is typical for part of the first and last destination words of each major section to remain unchanged by the insertion process. The function of the Mask Generator 3 is to produce the bit patterns required for proper operation of the Pattern Generator 4, so that such parts of such first and last destination words remain unchanged. However, this function is also not necessary to implement the present invention. Herein it is assumed that the pattern to be inserted does indeed affect the entire first and last destination words of each major section, in which case the Mask Generator 3 outputs all zeroes to the Pattern Generator 4.

The Pattern Generator 4 combines, for each destination word in each major section, some or all of the following information: (1) the (optionally) expanded and shifted source information from the Pattern Shifter; (2) the previously-existing contents of said word in display memory; (3) the preprogrammed contents of a Foreground Color Register; and (4) the preprogrammed contents of a Background Color Register; to produce new contents for said word in display memory in accordance with other preprogrammed register contents.

Figure 4:
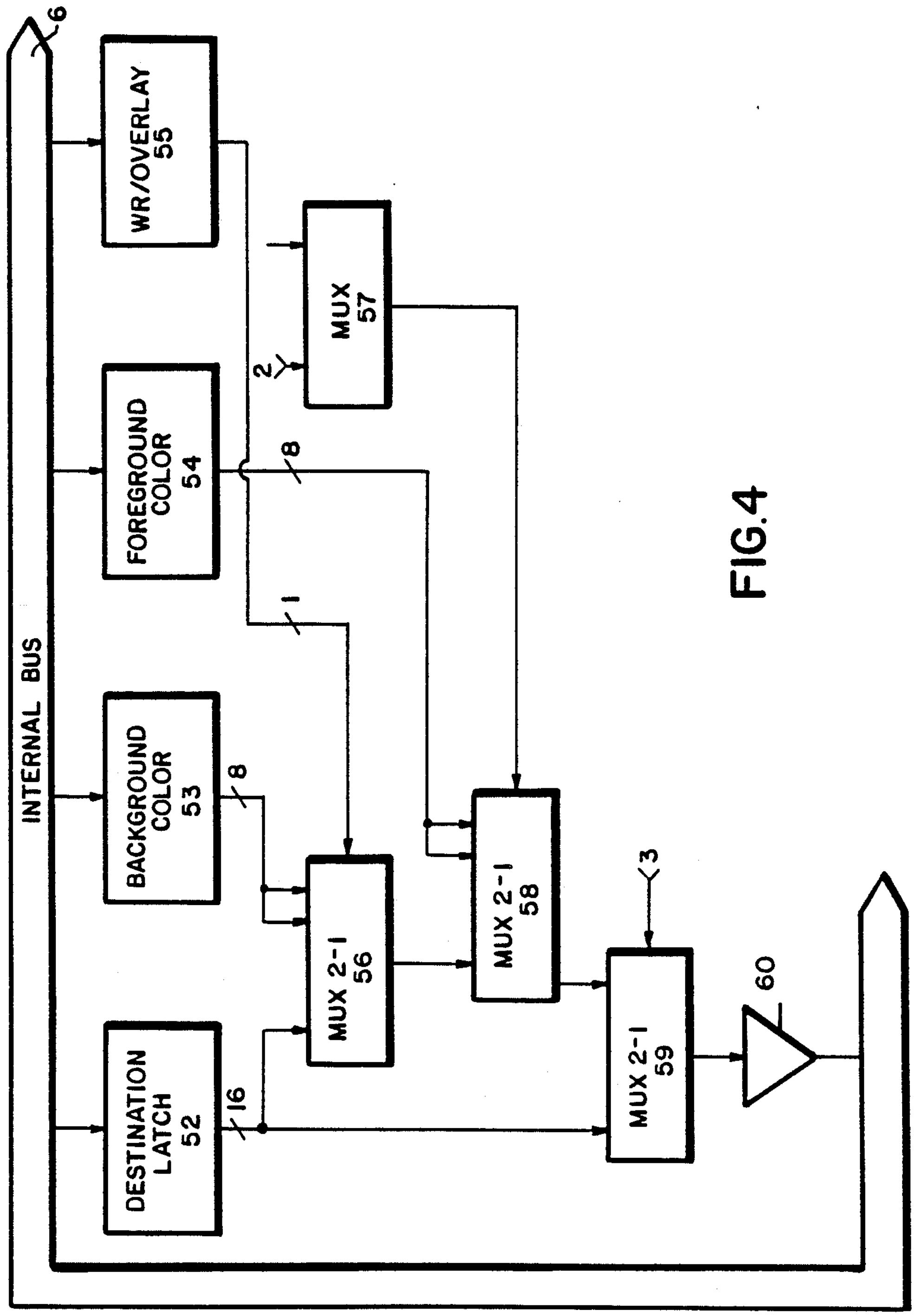
FIG. 4 shows portions of the Pattern Generator unit of the controller in FIG. 1.

FIG. 4 shows details of the Pattern Generator 4. Prior to the start of active operation, certain registers are preprogrammed (e.g., by a system microprocessor). Write/Overlay Register 55 is programmed to the "Write" state if pixels corresponding to zeroes in the monochrome are to be changed to the contents of the Background Color Register, or to the "Overlay" state if such pixels are to be left unchanged in display memory. Foreground Color Register 54 is programmed to contain the value to which pixels corresponding to ones in the monochrome pattern are to be changed. If Write/Overlay Register 55 is programmed to "Write", then Background Color Register 53 is read-out to provide the value to which pixels corresponding to zeroes in the monochrome pattern are to be changed.

In the preferred embodiment, both the Color Registers 53 and 54 are implemented as 8 bits wide. Because the major data paths of the Pattern Generator are 16 bits wide, the outputs of these registers are replicated twice into the inputs of Multiplexers 56 and 58 respectively. If the number of destination bits/pixel is 4, 2, or 1, then the Color Registers are typically programmed with the desired pixel value replicated 2, 4, or 8 times, respectively, but alternatively in this case, various graphic-pattern effects can be produced on the screen by programming the 2, 4, or 8 pixels in a Color register to different values.

The Update Control Unit 5, operating via the Interface Controller (not shown), reads one source word from memory and places the data therefrom into the Source Latch 7, for each 8, 4, 2, or 1 destination words written into memory. For each such destination word, the Update Control Unit 5 may read the data from the word and place the data therefrom into the Destination latch register 52. (The invention applies to both a simple embodiment of an Update Control Unit 5, which always reads each destination word from memory and to a more complex and efficient embodiment which uses additional signals from the other blocks, so as to omit this step of reading a destination word if/when its contents are not needed to form the new contents for the word.)

2:1 Multiplexer 56 selects between existent destination pixels from the Destination Latch 52 or the pixels from the Background color Register 53, all 16 of its bits or stages being controlled by the common signal from the Write/Overlay Register 55. Thus the output of Multiplexer 56 may be characterized as the "effective background" that is used for pixels corresponding to zeroes in the monochrome pattern.

Multiplexer 57 propagates the "expanded and shifted" source data from the Pattern Shifter 2 to its outputs.

2:1 Multiplexer 58 selects between the "effective background" from Multiplexer 56, or the pixels from the Foreground color register 54, each of its bits or stages being individually controlled by the corresponding bit from Multiplexer 57. Thus the selection for each bit is, in effect, controlled by the Pattern Shifter 2, the Expander 1, and ultimately by one of the monochrome bits in the Source Latch 7. The output of Multiplexer 58 may be characterized as the integration of the foreground and background parts of the pattern.

2:1 Multiplexer 59 selects between the output of Multiplexer 58 and the output of Destination Latch 13, each of its bits or stages being individually controlled by the corresponding bit from the Mask Generator 3. This multiplexer handles the preservation of "unaffected" pixels in the first and last destination words for each scan line. For clarity in describing the invention, Multiplexer 59 can be assumed to propagate the data from Multiplexer 58 to its outputs.

The Drivers 60 are controlled by the Update Control Unit 5 so as to place the output from Multiplexer 59 on the internal bus 6, at the appropriate time so that it is propagated to the device's external data pins, and ultimately written as the destination word into the display memory.

The Update Control Unit 5 controls the repetition of this process for each destination word in each scan line of the monochrome pattern, reading new source words from the monochrome pattern as needed.

The invention is generally applicable to any 3-way multiplexing scheme among existing destination data and two preprogrammed constant registers, said multiplexing controlled by a single write/overlay control bit and a plurality of foreground/background control bits that are derived from expanding a monochrome pattern by the method described herein.

We claim:

1. A video display controller for use in a color image display system for expanding a monochrome image pattern stored in a display memory in the form of one bit per image pixel to a color image pattern having multiple bits signifying foreground and background color of each pixel, and integrating such multiple bits with the stored bit pattern to derive a corresponding color image; such video controller comprising:

a bit expander circuit including a source latch for storing the pixel bits of a part of said monochrome image;

bits per pixel means for setting the number of bits per pixel in the expanded color image of said part of said monochrome image, to thereby define the extent of the multiple bit expansion to be performed;

source tracking means which monitor the contents of said source latch and signal when to reload said source latch from said display memory; and expansion logic circuit means having inputs connected to outputs of said source latch, said bits per pixel means, and said source tracking means; said expansion logic circuit means having outputs at which it produces signals respectively representing the contents of said source latch and a number of consecutive bits corresponding to an expansion of the contents of said source latch, the number of consecutive bits in such expansion which correspond to each bit in the source latch being as defined by said bits per pixel means;

pattern alignment means for shifting the signals at the outputs of said expansion logic circuit means so as to correspond to the positioning of destination words stored in said display memory;

pattern generating circuit means including a foreground color register programmable with pixel values to be substituted for "1" pixel bits of said monochrome image;

a background color register programmable with pixel values which are to be substituted for "0" pixel bits of said monochrome image;

a single-bit register programmable to control whether "0" pixel bits in said monochrome image pattern are to remain unchanged or are to be replaced by pixel values stored in said background color register;

a destination latch for temporarily storing destination words stored in said display memory; and multiplexing means which selects among the contents of said foreground color register, said background color register and said destination latch under control of said single-bit register and said pattern alignment means; said multiplexing means having an output at which it produces new destination words for replacing destination words currently stored in said display memory; and control means which sequence the reading of said display memory and storage of data therefrom in said source latch and in said destination latch, and the writing of said new destination words provided by said multiplexing means into said display memory.

2. A video display controller as claimed in claim 1, wherein said bits per pixel means is programmable to set the number of bits per pixel in the monochrome image at any of 1, 2, 4, or 8 bits per such pixel.

3. A video display controller as claimed in claim 1, wherein said bits per pixel means is a programmable register.

4. A video display controller as claimed in any of claims 1, 2 or 3, wherein said source tracking means comprises: a counter capable of counting from zero through the number of bits per pixel minus 1; and a multiplexer having data inputs at which it receives the outputs of said counter and control inputs at which it receives the outputs of said bits per pixel means; said multiplexer having an output at which it produces a signal indicating when said source latch is to be reloaded.

5. A video display controller as claimed in any of claims 1, 2 or 3, wherein said expansion logic circuit means is a programmable logic array (PLA) structure.

6. In a raster scan video display controller of a computer controlled video display system, a logic circuit for expanding source pattern data of a monochrome image stored in a display memory of the system into destination pattern data of an expanded color image to be displayed, such logic circuit comprising:

an image update control unit for fetching source pattern data from said display memory;

an expander circuit comprising:

a programmable bit per pixel register for setting the number of bits in the displayed color image corresponding to each bit in said source pattern;

a counter for controlling the sequence of expanded bits corresponding to each bit in said source pattern;

a source pattern latch which sequentially receives monochrome source pattern data from said control unit;

a programmable logic array (PLA) having as inputs the contents of said source pattern latch, said bits per pixel register, and said counter; the output of said PLA being a sequence of expanded destination pattern data corresponding to said source pattern data; and a source completion multiplexer connected to said counter and to said bits per pixel register and producing an output signal indicating completion of the expansion of the source pattern data in said source pattern latch, such signal causing said control unit to fetch the next source pattern from said display memory for storage in said source pattern latch, such signal being produced when the output of said counter has a value corresponding to the number of bits per pixel set by said bits per pixel register;

a pattern generator comprising:

a foreground color latch programmable with a color code for the foreground color of the displayed image;

a background color latch programmable with a color code for the background color of the displayed image;

a destination latch which sequentially receives from said display memory destination pattern data corresponding to pixels of the displayed image;

a write/overlay register programmable to indicate whether the background of the displayed image is to be colored;

a background multiplexer for selecting between data in said destination latch and data in said background color latch under the control of said write/overlay register; and means controlled by said expanded destination data produced by said PLA to select between data from said foreground color latch and from said background multiplexer, such selected data representing the color expanded displayed image.

7. A logic circuit as claimed in claim 6, wherein said bits per pixel register is programmable to set the number of bits per pixel in the color expanded displayed image at any of one, two, four or eight bits per pixel in the monochrome image.

8. A logic circuit as claimed in claim 6, wherein a "0" bit in the monochrome source pattern is expanded to a series of bits in accordance with said second color code programmed into said background latch.

9. A logic circuit as claimed in claim 6, wherein a "0" bit in the monochrome source pattern is left unchanged.

10. A logic circuit as claimed in claim 6, wherein said monochrome source pattern is a character font in the monochrome image.

* * * * *